United States Patent
Katz et al.

(10) Patent No.: US 8,914,895 B1
(45) Date of Patent: Dec. 16, 2014

(54) MANAGING VERIFICATION OF INPUT DATA

(71) Applicants: Aaron T. Katz, Haverhill, MA (US);
Daniel V. Bailey, Pepperell, MA (US);
Yavir Amar, Ramla (IL)

(72) Inventors: Aaron T. Katz, Haverhill, MA (US);
Daniel V. Bailey, Pepperell, MA (US);
Yavir Amar, Ramla (IL)

(73) Assignee: EMC Corporation, Hopkinton, MA (US)

( * ) Notice: Subject to any disclaimer, the term of this patent is extended or adjusted under 35 U.S.C. 154(b) by 95 days.

(21) Appl. No.: 13/626,266

(22) Filed: Sep. 25, 2012

(51) Int. Cl.
*G06F 21/00* (2013.01)

(52) U.S. Cl.
USPC .......................................... 726/26; 713/187

(58) Field of Classification Search
CPC ... G06F 21/577; G06F 21/10; H04L 63/1416; H04L 63/1408; H04L 63/1433; H04N 21/4405

USPC .......................................................... 726/26
See application file for complete search history.

(56) References Cited

U.S. PATENT DOCUMENTS

| | | | |
|---|---|---|---|
| 2005/0235012 A1* | 10/2005 | Harry et al. ................... | 707/203 |
| 2009/0089869 A1* | 4/2009 | Varghese .......................... | 726/7 |
| 2011/0151788 A1* | 6/2011 | Castrogiovanni et al. ... | 455/41.2 |
| 2011/0304446 A1* | 12/2011 | Basson et al. ................. | 340/438 |

* cited by examiner

*Primary Examiner* — Yogesh Paliwal
(74) *Attorney, Agent, or Firm* — Krishnendu Gupta; Jason A. Reyes

(57) ABSTRACT

A method is used in managing verification of input data. A first set of input information is received at a first logical object, and a second set of input information is received at a second logical object. The first and second sets of input information are indicated as having a same origin. Based on the first and second sets of input information, it is determined whether the first set of input information is valid.

18 Claims, 1 Drawing Sheet

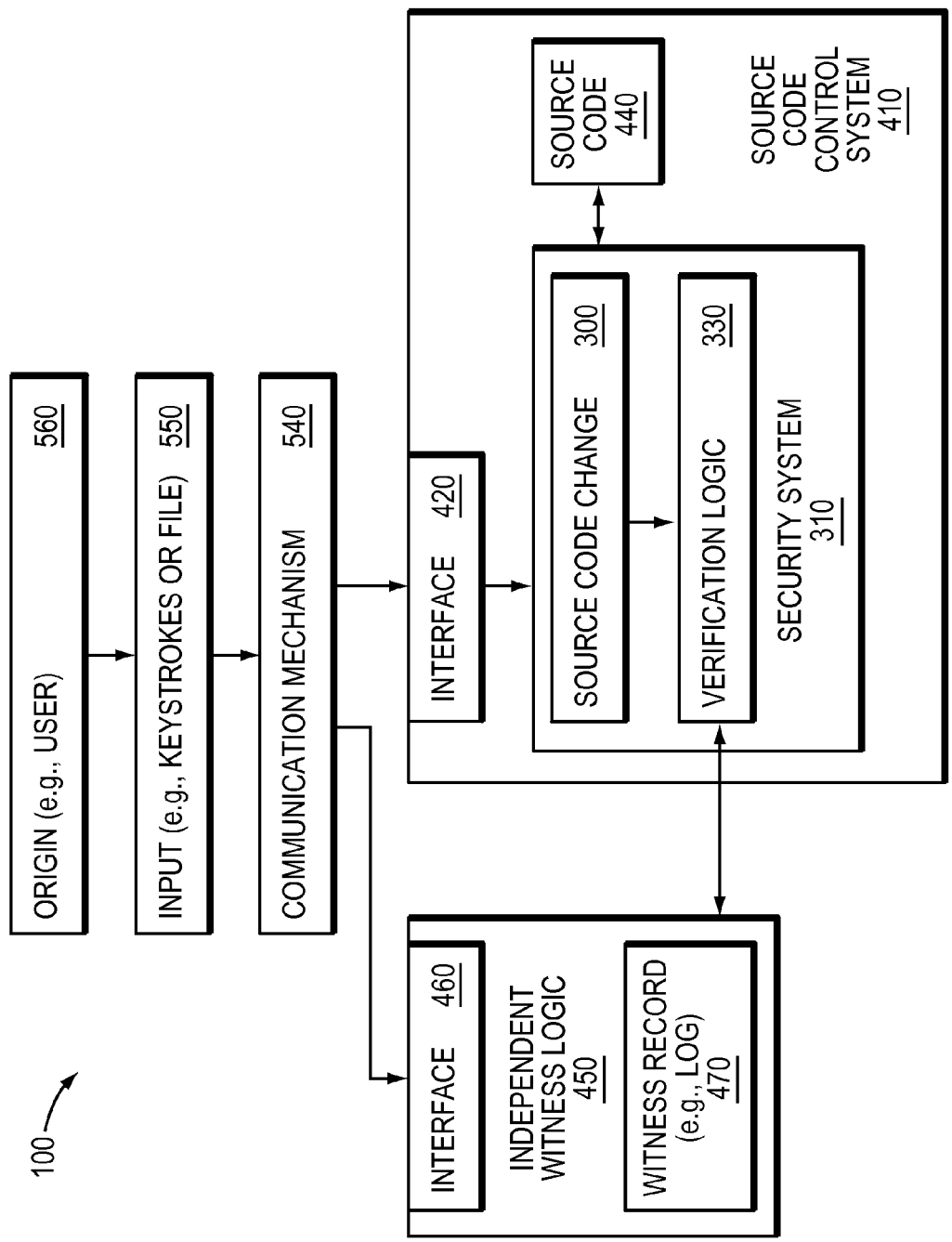

MANAGING VERIFICATION OF INPUT DATA

TECHNICAL FIELD

The present invention relates to managing verification of input data.

BACKGROUND OF THE INVENTION

Existing computer systems typically employ a variety of security-related functions for protection against potentially harmful user activity. For example, user authentication is often employed which requires a user to provide a password or other credentials which establishes the user's identity and protects against the possibility of an intruder or fraudster masquerading as an authorized user and engaging in harmful activity. Another type of function, referred to as access control, enforces limitations on the activities that authorized users can engage in. In one common example, access controls may be placed on certain storage devices or file system directories so that only certain users are permitted to access the data therein. Such access controls can serve to protect sensitive data from being accidentally deleted or used for an improper purpose by a user who has no legitimate need for access to the data. One dimension of access control may regard a type of user. Users can include typical or "non-privileged" users and "privileged" users who engage in more sensitive operations. Privileged users, who are normally selected in part based on perceived trustworthiness, are by definition granted greater access to system operational functions than is granted to non-privileged users.

Existing security functions may not always provide adequate protection against certain types of harmful activity. For example, the password of a user may be compromised enabling an intruder or fraudster to engage in harmful activities. In a further example, a privileged user can engage in harmful and unethical activities such as downloading sensitive information for their own benefit. It will be appreciated that such activities could cause tremendous problems and incur substantial cost to an organization.

It will also be known by those skilled in the art that so-called phishing attacks are also a substantial threat. A phishing attack usually involves an attacker or fraudster fooling the user to exchange secret data such as the log-on details. The attacker, a man-in-the-middle, uses the transmitted authentication data thereafter or simultaneously to affect a log-on procedure under the identity of the attacked authorized user and misuse the user's rights.

Organizations involved in software development may employ a source code control (SCC) system for managing source code assets produced by software developers. SCC systems provide numerous benefits to these organizations, including serving as a central source code repository for storing source code assets, retaining historical information about how source code assets have evolved over time, providing access to historical versions of the source code assets, and providing a mechanism for developers to share source code with team members.

The Bluetooth standard has been introduced to provide low-cost, short-range wireless communication between mobile devices such as a portable PC (Personal Computer) and a mobile phone. The Bluetooth standard enables wireless voice/data communication between various digital devices, using a radio frequency. For example, a mobile phone and a notebook computer (a portable PC), when employing the Bluetooth technology, can be wirelessly connected to each other without using a cable. The Bluetooth technology is applicable to all kinds of digital devices, including a PDA (Personal Digital Assistant), a desktop computer, a FAX (facsimile), a keyboard and a joystick.

The Bluetooth system supports point-to-point and point-to-multipoint connections. Devices sharing one channel should also share a channel capacity, and a set of these devices is called a "piconet". That is, the piconet is defined as a set of devices connected to one another through a Bluetooth ad-hoc network. In general, one piconet includes 7 devices: one of the 7 devices serves as a master for performing piconet management operations such as the generation of a frequency hopping pattern, while the remaining devices serve as slaves.

Recent advances in speech recognition (SR) technology and increases in hardware capabilities have made speech recognition based user interfaces for desktop and mobile systems commercially viable. SR technology takes spoken words and translates them into a format, which can easily be manipulated and displayed by digital systems.

Speech recognition software is currently available (e.g. NATURALLY SPEAKING from Dragon System, Inc., PLAINTALK from Apple Computer, VIA VOICE from IBM and FREESPEECH from Philips Talk).

Mobile devices can interact with digital computer networks to utilize speech recognition services in conjunction with the standard mobile device user interface (e.g. a phone keypad). A wireless communication system utilizes a remote speech recognition server system to translate voice input received from mobile devices into a mobile-suitable form that can be processed by the mobile devices. The translation process begins by establishing a voice communication channel between a mobile device and the speech recognition server. A user of the mobile device then begins speaking in a fashion that may be detected by the speech recognition server system. Upon detecting the user's speech, the speech recognition server system translates the speech into the mobile-suitable form, which is then sent to the user through a separate data communication channel.

Multimodal applications can accept multiple types, or modes, of input. For example, a multimodal application can accept input from users such as typed commands and mouse clicks; however the multimodal application also can accept other forms of input such as voice input. Voice recognition systems can interpret the voice input using a grammar that includes a particular vocabulary.

There is a need for computer systems to have further security-related functions for protection against potentially harmful activity.

SUMMARY OF THE INVENTION

A method is used in managing verification of input data. A first set of input information is received at a first logical object, and a second set of input information is received at a second logical object. The first and second sets of input information are indicated as having a same origin. Based on the first and second sets of input information, it is determined whether the first set of input information is valid.

BRIEF DESCRIPTION OF THE DRAWINGS

Features and advantages of the present invention will become more apparent from the following detailed description of exemplary embodiments thereof taken in conjunction with the accompanying drawings in which:

The FIGURE is an illustration of a system that may be used with the technique herein.

DETAILED DESCRIPTION

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described below is a technique for use in managing verification of input data. In at least one implementation, the technique may be used to help provide, among other things, independent witness functionality as described below.

At least one implementation relates to the integrity of source code, even in the face of a breach of a developer's workstation. In such an implementation, keystrokes and mouse movements are logged independently on a trusted device such as a smartphone. When source code is committed to a server implementing a source code repository, the server checks that the incoming code to be committed is consistent with the keystrokes and mouse movements captured by the phone.

The FIGURE illustrates an example computer system 100 which is an example of a system that may be used with one or more implementations of the technique described herein. System 100 has, among other things, a source code control system 410 that is used for managing the creation and/or updating of a software product. Such a software product (or project) may be created or updated over a fairly long period of time (many weeks) and may involve large teams of programmers. The system 410 is, includes, or is included in a source code repository, and includes source code 440 and an interface 420. The repository is a database that stores the current version of the source code that comprises the product and the interface 420 provide the programmers with access to the source code stored by the source code repository. The programmers may access the repository through a local area network such as an intranet within a business. Together with a security system 310 described below, the interface 420 manages the access to the source code.

The interface 420 is also used for checking out components from the source code repository and, later, for checking in a modified version of the component to the source code repository. Components within the source code repository can be checked out of the repository by a programmer who wishes to work on that specific component. The programmer makes additions and/or amendments to the source code, and when the programmer has completed the work, the programmer checks back in the new source code through the interface 420 to the repository. In this way, the source code that makes up the project is expanded and refined over time.

System 410 also includes security system 310 that receives any inputted source code and has access to historical versioned source code of source code 440 maintained by the repository. As described below, system 310 may be applied to changes or proposed changes between the modified version of the checked in component and the original component.

System 410 maintains source code for a hardware or software system, and the repository has the ability to track "changes"—creation, deletion or modification of source code files, along with change metadata. As used herein, a source code change means any creation, deletion, or modification of one or more source code files tracked by the source code repository. Modification includes but is not limited to partial or complete modification of a source code file. Source code change metadata, as used herein, means information tracked by a source code repository that is associated with changes. Each change is associated with change metadata. Change metadata includes but is not limited to the userid under whose account the change was made, whole or part of the file that changed, the date and time when the change was made, and a source code repository comment. Each source code control system comment, also referred to as a "repository comment", is free-form text that system 410 associates with change metadata. This is different from a source code comment, in that the source code comment can be viewed only by reading the file, while the repository comment can only be viewed using tools provided by the repository or system 410; if the file is removed from the repository, it still contains the source code comments, but it does not contain the repository comments.

System 100 also includes independent witness logic 450 having its own interface 460 and a witness record (such as a log) 470. Logic 450 is used as described below to help system 310 provide security for code 440.

As described in more detail below, system 100 operates as follows. Input 550 such as data representing, for example, keystrokes or a file is produced by an origin 560 such as a human user or an automated system. A communication mechanism such as a multipoint Bluetooth device communicates input 550 to system 410 via interface 420 and also communicates the same input 550 to logic 450 via interface 460, wherein interfaces 420, 460 may also be, included, or be included in Bluetooth devices. At system 410, a source code change 300 or other proposed dependency on input 550 is reviewed by system 310. System 310 has verification logic 330 that communicates with logic 450 to help determine whether any problems such as corruption or security breaches occurred with respect to processing of input 550 at system 410 or before input 550 reached system 410. In a particular example, since, in the absence of a security breach or other problem, the same input 550 is communicated by mechanism 540 to both system 410 and logic 450, logic 330 and logic 450 may be used to help determine whether data such as change 300 that is expected to be derived from input 550 is in fact derived from input 550. For example, if a hacker gains access to system 410 and provides change 300 together with an indication that change 300 came from origin 560, when logic 339 checks with logic 450, it may be determined that record 470 has insufficient evidence to corroborate the indication. In such a case, if, for example, the indication claims that change 300 is based on input provided from origin 560 on a particular date and time, and record 470 shows no input having been received from origin 560 at that date and time, logic 330 may determine that change 300 has a security problem.

Advantageously, system 100 provides two different paths to two different recipients, namely logic 450 and system 410, for input 550 from origin 560. In the event that input 550 is compromised on the path to system 410, or at system 410, logic 330 can help detect that the compromise has occurred, by comparing notes with logic 450. Security is further strengthened by the unlikeliness of a hacker or attacker being able to infiltrate or adversely affect both logic 450 and system 410, and coordinate such infiltration or effect, especially if logic 450 and system 410 are implemented by heterogeneous systems, such as a mobile phone and a desktop computer, respectively.

In at least some embodiments, the technique described herein may be used to help avoid some unfortunate conventional situations that have led to, for example, a possible backdoor having been discovered in a hardware chip, and hackers using stolen developer credentials to gain access to software repositories. In at least some of these conventional situations, hackers gained authentication credentials that provided access to development environments, and inserted malicious code changes intended to lower the security of the application. By contrast, at least some of these types of malicious code changes are identifiable by use of one or more systems based on the technique described herein.

Security of software applications relies on security of the source code. Conventionally, the ability to modify source code includes the ability to insert vulnerabilities such as backdoors, and in complex software, these vulnerabilities can be subtle and difficult to detect. Conventional software development environments may have one or both of two technical security controls relating to verification of code changes: (a) authentication to the source control system and (b) secured production branches. If a developer's (or administrator's) account is breached, conventionally that account can be used to make source code changes. Without further controls, conventionally the source code changes go straight into the production build and any vulnerabilities are shipped to all customers.

In conventional systems, secured production branches are sometimes used to create separation of duties such that developers check into an "unstable" branch and an authorized, trusted individual (an "approver") moves checkins from "unstable" to "stable," performing a manual code review in the process. This introduces complexity to the attacker, because the attacker must either compromise the approver's account or hide the vulnerability so that it goes undetected during the code review, which conventionally may not be difficult if the approver does a poor reviewing job as a result of, for example, having a large number of lines to review, or being unfamiliar with the code base and/or security vulnerabilities.

Conventionally, remediation can be quite difficult and expensive. A large software development organization may be responsible for the maintenance of hundreds of thousands of source code files, regularly modified by authorized accounts, and conventionally it can be prohibitively expensive for such organizations to review each and every line of code, or all recent code changes after a security breach.

By contrast, a system such as system 100 in accordance with the technique described herein can help with security, by use of a trusted device such as a smartphone to act as an "independent witness" based on logic 450. Technologies such as multipoint Bluetooth allow HIDs (Human Input Devices) to relay user actions to both an untrusted PC, which may include system 410, and a trusted smartphone, which may include logic 450. The smartphone may log keystrokes and mouse movements as input 550 in record 470, which can be used to provide an independent check of committed files of change 300.

At least one implementation based on the technique may entail the following:

1. A source-code repository that accepts files (or edits to files) (e.g., change 300) from a PC (e.g., origin 560) and 2. A transcript (e.g., record 470) of HID activity from a smartphone or other trusted device. If the input includes voice signals, the transcript may be produced by use of voice recognition technology.

3. Responsive to these inputs, the repository (via logic 330) compares the transcript and the file and 4. Generates a risk score based on the comparison and 5. Based on the score, allows or denies the code modifications.

In at least some implementations, a comparison between the transcript and the changes is necessarily probabilistic. For example, the smartphone may lack the ability to "see" the PC's display and therefore has only the approximate screen location corresponding to the user's input. Factors such as display resolution may make it difficult to determine precisely where on the screen the user is clicking.

Some additional measures may be used to help address some challenges. At the start of a session, the user may use the smartphone's camera to obtain an initial orientation and measurement of display resolution, which may allow the smartphone to accurately correlate HID actions such as typing and clicking with the user's intent. Such use may allow the smartphone to filter out HID activities that are not related to source-code development. Consider that a user may click away from the user's code editor to check email, for example, or perhaps to compile and test code. With this initial orientation, the smartphone can better detect when the user is entering HID activities to edit code.

Although a smartphone is referenced above, other embodiments are possible, such as a trusted virtual machine running on traditional PC hardware playing the independent witness role and having logic 450.

In another embodiment, logic 450 may be included in a head-mounted, augmented-reality display such as smart goggles. The smart glasses may act as our independent witness but with an added twist: in addition to receiving HID activities directly, it may use its sensors including camera, gyroscope, and/or accelerometers to provide further orientation and corroboration of the developer's intent.

Other variants or embodiments are possible. For example, instead of the smartphone delivering its HID transcript to the source control repository, the source control repository may deliver a transcript of the code changes to the smart phone, and the smart phone may generate a risk score, and may allow the submitting user to investigate the discrepancy. In another example, both the repository and the smart phone may deliver their transcripts to a trusted third party which performs the risk analysis and follows up by (a) returning a risk score to the repository, for the repository to decide what to do, (b) deciding what the repository should do and returning instructions to the repository, (c) alerting the submitting user, and/or (d) alerting an administrator.

With respect to communications, mechanism 540 may use multipoint Bluetooth or any networking technology, such as multicast Wi-Fi, or origin 560 may maintain multiple active connections to both interface 420 and interface 460.

Depending on the implementation, use of the technique may help thwart an attacker who is able to:

1. compromise only system 410 but not logic 450, or only logic 450 but not system 410,
2. compromise both system 410 and logic 450 but not in a way that coordinates sufficiently between system 410 and logic 450 to avoid detection by logic 330, and/or
3. compromise origin 560 but not enough to cause the same compromised input 550 to be communicated to both system 410 and logic 450.

One or more implementations based on the technique may be used to help verify input into other types of systems, such as banking systems, industrial control systems (e.g., for drug manufacturing), and vehicle (e.g., car, train) systems, e.g., for security, safety, and/or determinations of responsibility. Where it is useful or important to confirm or corroborate one version of a record or description of events, an implementation based on the technique may be applied to aid in related analysis. For example, in the case of an incident involving a vehicle wherein it is important to determine whether the incident resulted from a mechanical failure or the failure of an intervening system or of the driver, if logic 450 receives input from the driver or one or more systems, logic 450 can serve as an independent witness to the actions or inactions of the driver or system.

In some arrangements, at least a portion of system 100, such as system 410 and/or logic 450, is implemented using a set of processors (e.g., processing boards, a microprocessor, etc.) and memory which stores, among other things, a specialized application implementing logic 450, 330. In such arrangements, system 410 forms a specialized circuit when executing the specialized application.

It should be understood that the specialized application is capable of being delivered to and installed on system 410 and/or logic 450 from a computer program product. Such a computer program product includes a non-transitory computer readable storage medium which stores, in a non-volatile manner, instructions for performing the adaptive authentication operations. Examples of suitable computer readable storage media include CD-ROM, magnetic disk or tape cartridges, flash memory, disk memory, and the like. In addition to installing the application locally, it should be understood that such specialized software may be made available as a service via the Internet (e.g., SaaS).

While the invention has been disclosed in connection with preferred embodiments shown and described in detail, modifications and improvements thereon will become readily apparent to those skilled in the art. Accordingly, the spirit and scope of the present invention should be limited only by the following claims.

What is claimed is:

1. A computer-implemented method for use in managing verification of input data, the method comprising:
   receiving a first set of input information at a first logical object;
   receiving a second set of input information at a second logical object, wherein the first and second sets of input information are indicated as having a same origin; and
   based on the first and second sets of input information, determining whether the first set of input information is valid;
   characterized in that a trusted device comprises the second logical object, and keystrokes and mouse movements are logged independently on the trusted device.

2. The method of claim 1, wherein the second logical object helps to provide independent witness functionality.

3. The method of claim 1, wherein the first set of input information comprises source code and the second set of information comprises captured keystrokes and mouse movements, and when the source code is committed to a server implementing a source code repository, the determination is made by the server.

4. The method of claim 1, wherein the first and second sets of input information are received using multipoint Bluetooth.

5. The method of claim 1, wherein an untrusted PC comprises the first logical object and a trusted smartphone comprises a trusted smartphone, and the smartphone logs keystrokes and mouse movements used to provide an independent check files received at the untrusted PC.

6. The method of claim 1, wherein the second logical object records a transcript of human interface device activity from the origin, and the transcript comprises the second set of input information.

7. The method of claim 1, wherein the determination comprises making a comparison between a file received at the first logical object and a transcript of human interface device activity information received at the second logical object.

8. The method of claim 1, wherein a risk score is generated based on the first and second sets of input information.

9. The method of claim 1, wherein the second set of input information is based on voice recognition.

10. A system for use in managing verification of input data, the system comprising a processor and memory, the system configured to:
    receive a first set of input information at a first logical object;
    receive a second set of input information at a second logical object, wherein the first and second sets of input information are indicated as having a same origin; and
    determine based on the first and second sets of input information, whether the first set of input information is valid.;
    characterized in that a trusted device comprises the second logical object, and keystrokes and mouse movements are logged independently on the trusted device.

11. The system of claim 10, wherein the second logical object helps to provide independent witness functionality.

12. The system of claim 10, wherein the first set of input information comprises source code and the second set of information comprises captured keystrokes and mouse movements, and when the source code is committed to a server implementing a source code repository, the determination is made by the server.

13. The system of claim 10, wherein the first and second sets of input information are received using multipoint Bluetooth.

14. The system of claim 10, wherein an untrusted PC comprises the first logical object and a trusted smartphone comprises a trusted smartphone, and the smartphone logs keystrokes and mouse movements used to provide an independent check files received at the untrusted PC.

15. The system of claim 10, wherein the second logical object records a transcript of human interface device activity from the origin, and the transcript comprises the second set of input information.

16. The system of claim 10, wherein the determination comprises making a comparison between a file received at the first logical object and a transcript of human interface device activity information received at the second logical object.

17. The system of claim 10, wherein a risk score is generated based on the first and second sets of input information.

18. The system of claim 10, wherein the second set of input information is based on voice recognition.

* * * * *

UNITED STATES PATENT AND TRADEMARK OFFICE
CERTIFICATE OF CORRECTION

PATENT NO.       : 8,914,895 B1
APPLICATION NO.  : 13/626266
DATED            : December 16, 2014
INVENTOR(S)      : Aaron T. Katz et al.

It is certified that error appears in the above-identified patent and that said Letters Patent is hereby corrected as shown below:

On the Title Page

Inventors:
Katz; Aaron T. (Haverhill, MA)
Bailey; Daniel V. (Pepperell, MA)
Amar; Yavir (Ramla, IL)

SHOULD READ
Inventors:
Katz; Aaron T. (Haverhill, MA)
Bailey; Daniel V. (Pepperell, MA)
Amar; Yariv (Ramla, IL)

Signed and Sealed this
Twenty-fifth Day of August, 2015

Michelle K. Lee
*Director of the United States Patent and Trademark Office*